United States Patent Office 3,318,680
Patented May 9, 1967

3,318,680
METHOD FOR THE CONTROL OF WEEDS
George Levitt, Wilmington, Del., assignor to E. I. du Pont de Nemours and Company, Wilmington, Del., a corporation of Delaware
No Drawing. Filed July 6, 1964, Ser. No. 380,610
6 Claims. (Cl. 71—2.6)

This application is a continuation-in-part of application Ser. No. 147,145, filed Oct. 24, 1961, now abandoned.

This invention relates to methods of controlling undesirable plant growth.

More specifically, this invention refers to a method of applying to a locus to be protected, in amount sufficient to exert herbicidal action, a 4-aryl semicarbazide or its acid addition compound where the acid has an ionization constant greater than $2 \times 10^{-5}$.

The compounds used in this invention are represented by the formula:

(1)
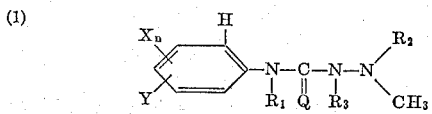

where
$R_1$ is hydrogen or alkyl of 1 through 4 carbon atoms;
$R_2$ is hydrogen, alkyl of 1 through 4 carbon atoms, substituted alkyl of 1 through 4 carbon atoms (the substituents being OH, CN, Cl, Br, or $CH_3O$), alkenyl of 2 through 4 carbon atoms or acyl of 1 through 4 carbon atoms;
$R_3$ is alkyl of 1 through 4 carbon atoms;
Q is oxygen or sulfur;
X is hydrogen, halogen or alkyl of 1 through 4 carbon atoms;
Y is hydrogen, halogen, nitro or alkoxy of 1 through 4 carbon atoms;
$n$ is 1 or 2; with the limitation that when Y is alkoxy or nitro, X is halogen.

It is preferred to use the compounds of formula (1) wherein
$R_1$ is hydrogen;
$R_2$ is alkyl of 1 through 4 carbon atoms or substituted alkyl of 1 through 4 carbon atoms (with the same substituents as above);
$R_3$ is methyl;
Q is oxygen;
X is hydrogen, chloro or alkyl of 1 through 4 carbon atoms;
Y is hydrogen, chloro or nitro; and
$n$ is 1 or 2.

Some of the particularly preferred compounds used in this invention include:

4-(3,4-dichlorophenyl)-1,1,2-trimethylsemicarbazide
4-(3-chloro-4-cumenyl)-1,1,2-trimethylsemicarbazide
4-(phenyl)-1,1,2-trimethylsemicarbazide
4-(p-bromophenyl)-1,1,2-trimethylsemicarbazide
4-(p-chlorophenyl)-1,1,2-trimethylsemicarbazide It will be understood that the above compounds form acid addition compounds with acids having an ionization constant greater than $2 \times 10^{-5}$ and such acid addition compounds are included within the scope of this invention. Preferred acids include:

2,3,6-trichlorobenzoic acid
p-Toluene sulfonic acid
2,4-dichlorophenoxyacetic acid
Trichloroacetic acid
Dodecylbenzenesulfonic acid

Preparation

The herbicidal compounds of this invention, where $R_1$ is hydrogen, are prepared by the reaction of an appropriately substituted aromatic isocyanate or aromatic isothiocyanate with a 1,2-dimethyl hydrazine.

(1)
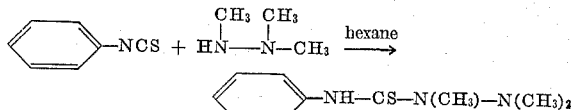

(2)
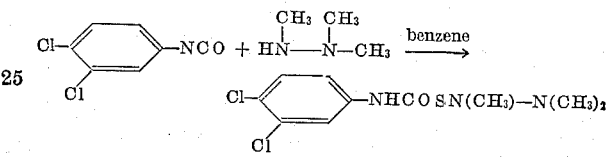

(3)
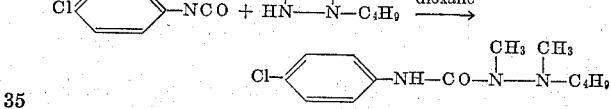

The reaction is preferably carried out in an inert solvent such as hexane, benzene, ether, xylene and dioxane at room temperature. Reagents are added slowly enough to control the exothermic reaction.

Syntheses of compounds where $R_1$ represents an alkyl group such as methyl, ethyl, propyl, and butyl are accomplished by combining the 1,2-dimethyl hydrazine and N-aryl-N-alkyl carbamoyl or a thiocarbamoyl chloride in an inert medium as:

(4)
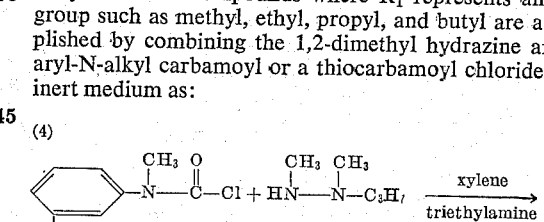

(5)
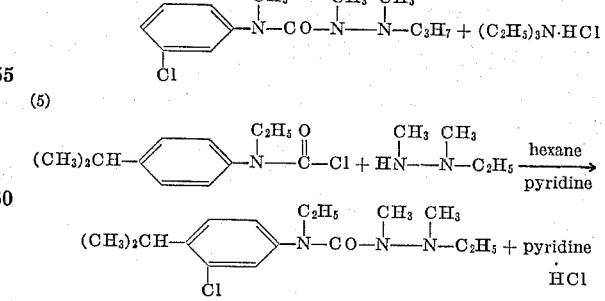

(6)

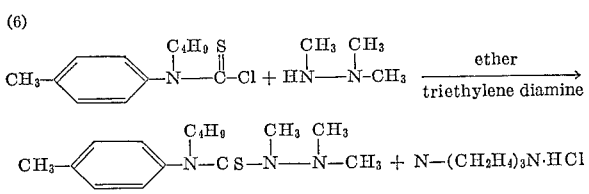

Suitable solvents for this reaction are ether, benzene, hexane, dioxane, xylene, and chlorobenzene. Tertiary amines such as triethylamine, pyridine and triethylenediamine aid the reaction by serving as acid acceptors, reducing the amount of hydrazine consumed by one-half. By proper choice of reagents the other compounds of this invention are prepared similarly.

The hydrazines used as intermediates in these preparations are prepared according to the reaction sequence described below.

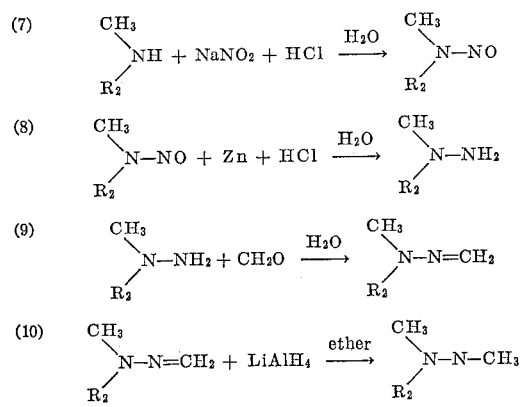

In these equations and those that follow $R_1$ and $R_2$ have the meaning defined above.

Equation (7) describes the reaction of a dialkylamine with nitrous acid to yield an N-nitroso derivative. Reduction of the nitroso compound (8) with zinc in hydrochloric acid followed by condensation with formaldehyde (9) gives the methylene hydrazone. Reduction of the hydrazone by lithium aluminum hydride (10) yields the desired hydrazine. Alternative routes such as the reaction of active organo halide with sym-dimethyl hydrazine (11) can be used in place of reactions (7) through (10).

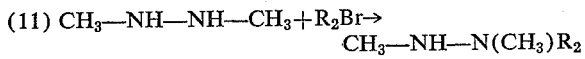

The acid addition compounds are prepared by substituting the desired 4-aryl semicarbazide and acid in equation number (12).

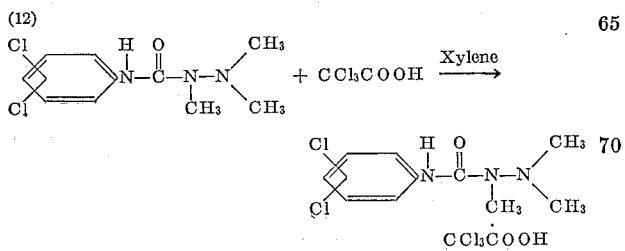

Use

The compounds used in this invention, e.g. 4-(3,4-dichlorophenyl)-1,1,2-trimethyl semicarbazide and its acid addition compounds are particularly useful as selective herbicides in such weedy species as wild oats, crabgrass, barnyard grass, foxtail, Johnson grass, alfalfa and pigweed without injury to corn or cotton.

The 1,2-dimethyl-4-aryl semicarbazides and their acid addition compounds can be used for pre-emergence weed control in crops such as corn, sorghum, cotton, soybeans, and peanuts at rates of 0.5 to 3.0 pounds per acre. They give weed control in the crops listed above when applied as directed post-emergence sprays at rates of 0.5 to 4.0 pounds per acre. In such crops as sugar cane and asparagus, it is possible to apply these compounds at slightly higher rates as pre-emergence and directed sprays to control hard-to-kill weeds.

Composition

Herbicidal compositions of this invention comprise a compound used in this invention and a wetting agent.

The surface-active agent used in this invention can be a dispersant or an emulsifying agent which will assist dispersion of the composition in liquid form. The surface-active agent or surfactant can include such anionic, cationic and non-ionic agents as have heretofore been generally employed in pest control compositions of similar type. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual" (1963) by John W. McCutcheon, Inc., and Bulletin E–607 of the Bureau of Entomology and Plant Quarantine of the U.S. Department of Agriculture.

Suitable surface-active agents for use in compositions of the present invention are: polyethylene glycol fatty esters and fatty alkylol amide condensates, alkyl aryl sulfonates, fatty alcohol sulfates, dialkyl esters of sodium sulfosuccinate, fatty acid esters of sodium isethionate, polyoxyethylene thioether, and long chain quaternary ammonium chloride.

Among the more preferred surfactants are the anionic and non-ionic type. Among anionic surface-active agents, preferred ones are alkali metal or amine salts of alkyl benzene sulfonic acids such as dodecylbenzene sulfonic acid, sodium lauryl sulfate, alkyl naphthalene sulfonates, sodium N-methyl-N-oleoyltaurate, oleic acid ester of sodium isothionate, dioctyl sodium sulfosuccinate, sodium dodecyldiphenoloxide disulfonate. Among non-ionic compounds, preferred members are alkyl phenoxy poly-(ethyleneoxy) ethanols such as nonyl phenol adducts with ethylene oxide; trimethyl nonyl polyethylene glycol ethers, polyethylene oxide adducts of fatty and rosin acids, long chain alkyl mercaptan adducts with ethylene oxide.

In general, less than 10% by weight of the wetting agent will be used in compositions of this invention and ordinarily the amount of wetting agent will be less than 1% by weight.

Additional surface-active agents can be added to the above formulation to increase the ratio of surface-active agent:active agent up to as high as 4:1 by weight.

The herbicidal compositions of this invention can additionally contain finely divided inert diluents such as talcs, natural clays including attapulgite clay, pyrophyllite, diatomaceous earth, synthetic fine silicas, calcium silicate, carbonates, calcium phosphates, sulfur, lime, and such flours as walnut shell, wheat, redwood, soya beans and cottonseed.

The amount of the finely divided inert solid diluent can vary widely and can range from 10 to 95% by weight of the herbicidal composition. The particle size can vary considerably but will ordinarily be somewhat under 50 microns in the finished formulation.

Among the preferred compositions of this invention are emulsifiable oil solutions. In these, the 4-aryl semicarbazide, the surface-active agent and an oil form a liquid which can conveniently be poured and measured. Such solutions can be mixed with water at the point of application to form an emulsion containing the herbicide and the surface-active agent. Such compositions have the advantage that the oil will often act as a foam inhibitor and thus reduce the tendency for large amounts of surfactants to form objectionable foam. It is also possible to include in such formulations oils which have herbicidal action of their own.

The oil should preferably be water-immiscible and be of a type in which the active agent will be soluble in the amounts used in particular formulations.

Emulsifiable liquid compositions can be made with an aliphatic or aromatic hydrocarbon oil having a boiling point of 100 to 400° C. Typical of the hydrocarbon oils that can be used are commercial herbicidal oils such as "Lion Herbicidal Oil No. 6," diesel oils, kerosene, paraffin oils and fuel oils.

In the herbicidal compositions containing oils the 4-aryl semicarbazide will be present in amounts ranging from 0.5% to 95% by weight. Precise concentration of active agent, of course, will depend on the intended use for the composition.

The above-described composition can be formulated with other materials optionally, such as fertilizers, pest control agents including insecticides and fungicides and other herbicides. Highly effective herbicidal compositions can be prepared comprising at least one compound of this invention in admixture with another herbicidally active ingredient.

Application

The method of applying the compositions of this invention comprises applying a 4-aryl semicarbazide, ordinarily in a herbicidal composition of one of the aforementioned types, to a locus or area to be protected from undesirable plant growth. The active compound, of course, is applied in amounts sufficient to exert the desired herbicidal action. The amount of the 4-aryl semicarbazide to be used in clearing lands of weeds will naturally depend on the condition of the vegetation, the degree of herbicidal activity desired, the formulation used, the mode of application, the climate, the season of the year, and other variables. Recommendations as to precise amounts are, therefore, not possible. In general, however, direct foliage application as a liquid spray or dust to the locus to be protected using from 0.5 to 40 pounds per acre of the herbicidal compounds used in this invention will be satisfactory.

Complete weed kill of vegetation is obtained with an extended residual period when the compounds are applied at rates of about 15 to 40 pounds (active) per acre.

The following illustrative examples are provided so as to more clearly describe the invention and to make it more understandable.

EXAMPLE 1

*4-(3,4-dichlorophenyl)-1,1,2-trimethylsemicarbazide*

To 19 parts by weight of 3,4-dichlorophenylisocyanate in 100 parts of hexane is added 7.4 parts by weight of trimethylhydrazine at such a rate that the temperature is maintained below reflux. The precipitated product, M.P. 145–146°, thus formed, is removed by filtration in quantitative yield.

*Analysis.*—Calc'd for $C_{10}H_{13}Cl_2N_3O$: C, 45.8; H, 5.0. Found: C, 45.6; H, 5.1.

EXAMPLE 2

*4-(4-chlorophenyl)-1,1,2-trimethylsemicarbazide*

Substituting 14.3 parts by weight of p-chlorophenylisocyanate for 3,4-dichlorophenylisocyanate in Example 1 gives essentially a theoretical yield of the desired product, M.P. 103–105°. This is recrystallized from alcohol to M.P. 106.5–108.5°

*Analysis.*—Calc'd for $C_{10}H_{14}ClN_3O$: C, 52.8; H, 6.24. Found: C, 52.83; H, 6.22.

EXAMPLE 3

*1,1,2-trimethyl-4-phenylsemicarbazide*

Addition of 4.5 parts by weight of trimethylhydrazine to 6 parts by weight of phenylisocyanate in 50 parts by weight of hexane gives 9 parts by weight of the desired semicarbazide, M.P. 67–69°.

*Analysis.*—Calc'd for $C_{10}H_{15}N_3O$: C, 62.4; H, 7.83. Found: C, 62.35; H, 7.76.

EXAMPLE 4

*4-(5-chloro-2-methoxyphenyl)-1,1,2-trimethylsemicarbazide*

To 100 parts by weight of a xylene solution containing 0.1 molar 5-chloro-2-methoxyphenylisocyanate is added 7.4 parts of trimethylhydrazine with stirring. The xylene is topped off and the residue is taken up in 50 parts of methylene chloride and filtered. Evaporation of the methylene chloride gives 7.2 parts by weight of the desired product, M.P. 97–99°.

*Analysis.*—Calc'd for $C_{10}H_{16}ClN_3O_2$: C, 51.5; H, 6.28. Found: C, 52.07; H, 6.38.

EXAMPLE 5

*4-(3-chloro-4-cumenyl)-1,1,2-trimethylsemicarbazide*

To 9.75 parts by weight of 3-chloro-4-cumenylisocyanate in 25 parts by weight of hexane is added dropwise 3.7 parts by weight of trimethylhydrazine with stirring. The product, 8.0 parts by weight, is filtered off as a white crystalline solid M.P. 82–83°.

*Analysis.*—Calc'd for $C_{13}H_{20}ClN_3O$: C, 58.0; H, 7.5. Found: C, 58.1; H, 7.3.

EXAMPLE 6

*4-(3,4-dichlorophenyl)-1,2-dimethylsemicarbazide*

A solution, prepared from 24 parts by weight of 3,4-dichlorophenyl isocyanate in 30 parts by weight of dry dioxane, is added dropwise to 200 parts by weight of dry dioxane containing 100 parts of pyridine and 40 parts by weight of sym-dimethylhydrazine hydrochloride. After two hours, the mixture is flooded with 2 volumes of water and the resultant solid filtered off. The product is refluxed in 10 parts alcohol to 1 part product and filtered. Evaporation of the alchol yields 13 parts by weight of the desired product which can be recrystallized from ethyl acetate to M.P. 118–120°.

*Analysis.*—Calc'd for $C_9H_{11}Cl_2N_3O$: C, 43.57; H, 4.47. Found: C, 42.7; H, 4.48.

EXAMPLE 7

*4-(p-bromophenyl)-1,1,2-trimethylsemicarbazide*

Using the procedure described in Example 1, an 85% yield of the subject compound (crude M.P. 130–137°) is obtained from 10 parts by weight of p-bromophenylisocyanate and 3.7 parts of trimethylhydrazine.

*Analysis.*—Calc'd for $C_{10}H_{14}BrN_3O$: C, 44.3; H. 5.2. Found: C, 44.4; H, 5.1.

EXAMPLE 8

*4-(3-bromo-4-tolyl)-1,1,2-trimethylsemicarbazide*

From 200 parts by weight of a previously prepared ca. 1.0 molar solution of 3-bromo-4-tolylisocyanate in xylene and 7.4 parts by weight of trimethylhydrazine is obtained 10 parts by weight of the desired semicarbazide. Recrystallization from cyclohexane gives a M.P. 102.5–105°.

*Analysis.*—Calc'd for $C_{11}H_{16}BrN_3O$: C, 46.2; H, 5.64. Found: C, 47.1; H, 5.9.

EXAMPLE 9

*4-(3,4-xylyl)-1,1,2-trimethylsemicarbazide*

The product is obtained in quantitative yield from the reaction of 7.4 parts by weight of trimethylhydrazine with 14.7 parts by weight of 3,4-xylene isocyanate in hexane, M.P. 74–75°.

*Analysis.*—Calc'd for $C_{12}H_{19}N_3O$: C, 65.2; H, 8.63. Found: C, 64.9; H, 8.55.

By substituting the hydrazines and isocyanates for their counterparts in Example 1 semicarbazides of this invention are prepared as listed in Table I below.

EXAMPLE 46

*4-(3,4-dichlorophenyl)-1,1,2,4-tetramethylsemicarbazide*

Into a solution prepared from 108 parts by weight of phosgene and 1000 parts of xylene is added dropwise 175 parts of 3,4-dichloro-N-methylaniline in 100 parts xylene. The mixture is slowly heated to reflux until

TABLE I

| Ex. | Hydrazine | Isocyanate | Semicarbazide |
| --- | --- | --- | --- |
| 10 | 1,2-dimethylhydrazine | Phenylisocyanate | 1,2-dimethyl-4-phenylsemicarbazide. |
| 11 | ----do---- | m-Chlorophenylisocyanate | 4-(m-chlorophenyl)-1,2-dimethylsemicarbazide. |
| 12 | ----do---- | p-Chlorophenylisocyanate | 4-(p-chlorophenyl)-1,2-dimethylsemicarbazide. |
| 13 | 1-ethyl-1,2-dimethylhydrazine | p-Bromophenylisocyanate | 4-(p-bromophenyl)-1-ethyl-1,2-dimethylsemicarbazide. |
| 14 | 1-propyl-1,2-dimethylhydrazine | p-Fluorophenylisocyanate | 4-(p-fluorophenyl)-1-propyl-1,2-dimethylsemicarbazide. |
| 15 | 1-isopropyl-1,2-dimethylhydrazine | p-Tolylisocyanate | 1-isopropyl-1,2-dimethyl-4-(p-tolyl)semicarbazide. |
| 16 | 1,1,2-trimethylhydrazine | p-Ethylphenylisocyanate | 4-(p-ethylphenyl)-1,1,2-trimethylsemicarbazide. |
| 17 | ----do---- | p-Cumenylisocyanate | 4-(p-cumenyl)-1,1,2-trimethylsemicarbazide. |
| 18 | ----do---- | m-Tolylisocyanate | 1,1,2-trimethyl-4-(m-tolyl)semicarbazide. |
| 19 | ----do---- | m-Cumenylisocyanate | 4-(m-cumenyl)-1,1,2-trimethylsemicarbazide. |
| 20 | ----do---- | p-Butylphenylisocyanate | 4-(p-butylphenyl)-1,1,2-trimethylsemicarbazide. |
| 21 | ----do---- | m-Isobutylphenylisocyanate | 4-(m-isobutylphenyl)-1,1,2-trimethylsemicarbazide. |
| 22 | ----do---- | p-Sec-butylphenylisocyanate | 4-(p-sec-butylphenyl)-1,1,2-trimethylsemicarbazide. |
| 23 | ----do---- | m-Propylphenylisocyanate | 1,1,2-trimethyl-4-(m-propylphenyl)semicarbazide. |
| 24 | ----do---- | o-Bromophenylisocyanate | 4-(o-bromophenyl)1,1,2-trimethylsemicarbazide. |
| 25 | ----do---- | 2,4-dichlorophenylisocyanate | 4-(2,4-dichlorophenyl)-1,1,2-trimethylsemicarbazide. |
| 26 | ----do---- | 3,5-dichlorophenylisocyanate | 4-(3,5-dichlorophenyl)-1,1,2-trimethylsemicarbazide. |
| 27 | 1-ethyl-1,2-dimethylhydrazine | 2,5-dichlorophenylisocyanate | 4-(2,5-dichlorophenyl)1-ethyl-1,2-dimethylsemicarbazide. |
| 28 | 1-propyl-1,2-dimethylhydrazine | 2,4-xylyisocyanate | 1-propyl-1,2-dimethyl-4-(2,4-xylyl)-semicarbazide. |
| 29 | 1-butyl-1,2-dimethylhydrazine | 3-chloro-4-tolylisocyanate | 4-(3-chloro-4-tolyl)-1-butyl-1,2-dimethylsemicarbazide. |
| 30 | 1-propionyl-1,2-hydrazine | 3-methyl-4-cumenylisocyanate | 4-(3-methyl-4-cumenyl)-1,2-dimethyl-1-propionylsemicarbazide. |
| 31 | 1-(3-cyanopropyl)1-,2-dimethylhydrazine. | 3-chloro-4-tolylisocyanate | 4-(3-chloro-4-tolyl)-1-(3-cyanopropyl)-1,2-demethylsemicarbazide. |
| 32 | 1-(4-hydroxybutyl)-1,2-demethylhydrazine. | 3-chloro-4-cumenylisocyanate | 4-(3-chloro-4-cumenyl)-1-(4-hydroxybutyl)-1,2-dimethylsemicarbazide. |

EXAMPLE 33

*4-(3,4-dichlorophenyl)-1,1,2,-trimethyl-3-thiosemicarbazide*

To 20 parts by weight of 3,4-dichlorophenylisothiocyanate in 75 parts by weight of hexane is added dropwise, with stirring, 7.4 parts by weight of trimethylhydrazine. The solid product, thus obtained, is filtered off in 90% yield M.P. 113–116°. Recrystallization from alcohol raises the melting point to 118–119°.

*Analysis.*—Calc'd for $C_{10}H_{14}Cl_2N_3S$: C, 43.4; H, 4.72. Found: C, 43.4; H, 4.72.

By substituting the hydrazines and isothiocyanates for their counterparts in Example 33 the following thiosemicarbazides of this invention are prepared.

the evolution of hydrogen chloride ceases and the cloudy solution becomes clear. After removal of the excess phosgene by topping off 50 parts of the exylene the mixture is cooled to room temperature. To the resultant solution is added dropwise 100 parts by weight of trimethylamine followed by 74 parts by weight of trimethylhydrazine.

The desired product is obtained in crude form suitable for herbicidal use by removing the insoluble trimethylamine hydrochloride by filtration and topping off the solvent from the filtrate.

By substituting the hydrazines and anilines for their counterparts in Example 46 the following semicarbazides are prepared.

TABLE II

| Ex. | Hydrazine | Isothiocyanate | Thiosemicarbazide |
| --- | --- | --- | --- |
| 34 | 1,1,2-trimethylhydrazine | Phenylisothiocyanate | 1,1,2-trimethyl-4-phenylthiosemicarbazide. |
| 35 | ----do---- | p-Tolyisothiocyanate | 1,1,2-trimethyl-4-(p-tolyl)thiosemicarbazide. |
| 36 | 1-acetyl-1,2-di-methylhydrazine | p-Chlorophenylisothiocyanate | 1-acety l-4-(p-chlorophenyl)-1,2-dimethylthio-semicarbazide. |
| 37 | 1-butyryl-1,2-dimethylhydrazine | m-Propylphenylisothiocyanate | 1-butyryl-4-(m-propylphenyl)1-2-dimethyl-thiosemicarbazide. |
| 38 | 1-(2-hydroxyethyl)-1,2-dimethylhydrazine. | 4-chloro-3-nitrophenylisothiocyanate | 4-(4-chloro-3-nitrophenyl)-1-(2-hydroxyethyl)-1,2-dimethylthiosemicarbazide. |
| 39 | 1,2-dimethyl-1-(2-propenyl)-hydrazine. | m-Bromophenylisothiocyanate | 4-(m-bromophenyl)-1,2-dimethyl-1-(2-propenyl)-thiosemicarbazide. |
| 40 | 1,1,2-trimethylhydrazine | m-Chlorophenylisothiocyanate | 4-(m-chlorophenyl)-1,1,2-trimethylthiosemicarbazide. |
| 41 | ----do---- | p-Chlorophenylisothiocyanate | 4-(p-chlorophenyl)-1,1,2-trimethylthiosemicarbazide. |
| 42 | ----do---- | 2,4-dichlorophenylisothiocyanate | 4-(2,4-dichlorophenyl)-1,1,2-trimethylthiosemicarbazide. |
| 43 | ----do---- | 3,4,5-trichlorophenylisothiocyanate | 4-(3,4,5-trichlorophenyl)-1,1,2-trimethylthiosemicarbazide. |
| 44 | ----do---- | 3,4-dichloro-6-nitro-phenylisothiocyanate. | 4-(3,4-dichloro-6-nitrophenyl)-1,1,2-trimethylthiosemicarbazide |
| 45 | ----do---- | 3,4-dichloro-5-methyoxphenylisothiocyanate. | 4-(3,4-dichloro-5-methoxyphenyl)-1,1,2-trimethylthiosemicarbazide. |

TABLE III

| Ex. | Hydrazine | Aniline | Semicarbazide |
|---|---|---|---|
| 47 | 1,1,2-trimethylhydrazine | N-methylaniline | 1,1,2,4-tetramethyl-4-phenylsemicarbazide. |
| 48 | ____do____ | p-Chloro-N-methylaniline | 4-(p-chlorophenyl)-1,1,2,4-tetramethylsemicarbazide. |
| 49 | ____do____ | p-Chloro-N-ethylaniline | 4-(p-chlorophenyl)-4-ethyl-1,1,2-trimethylsemicarbazide. |
| 50 | ____do____ | p-Tolyl-N-propylaniline | 1,1,2-trimethyl-4-propyl-4-(p-tolyl)-semicarbazide. |
| 51 | ____do____ | p-Cumenyl-N-methylamine | 4-(p-cumenyl)-1,1,2,4-tetramethylsemicarbazide. |
| 52 | 1,2-dimethylhydrazine | p-Chloro-N-methylaniline | 4-(p-chlorophenyl)-1,2,4-trimethylsemicarbazide. |
| 53 | 1,2-dimethyl-1-propionylhydrazine | p-Bromo-N-methylaniline | 4-(p-bromophenyl)-1,2,4-trimethyl-1-propionylsemicarbazide. |
| 54 | 1,2-dimethyl-1-propylhydrazine | p-Fluoro-N-butylaniline | 4-butyl-4-(p-fluorophenyl)-1,2-dimethyl-1-propylsemicarbazide. |
| 55 | 1,2-dimethyl-1-butylhydrazine | 3-chloro-4-fluoro-N-methylaniline | 1-butyl-4-(3-chloro-4-fluorophenyl)-1,2,4-trimethylsemicarbazide. |

By substituting the hydrazines and anilines for their counterparts in Example 46 and using thiophosgene in place of phosgene the following thiosemicarbazides are prepared.

EXAMPLES 65a 4-(3,4-xylyl)-1,1,2-trimethylsemicarbazide

| | Percent by weight |
|---|---|
| 4-(3,4-xylyl)-1,1,2-trimethylsemicarbazide | 50 |
| Alkyl naphthalene sulfonate, Na salt | 1.5 |
| Low viscosity methylcellulose | 0.3 |
| Low density synthetic calcium silicate | 48.2 |

TABLE IV

| Ex. | Hydrazine | Aniline | Thiosemicarbazide |
|---|---|---|---|
| 56 | 1,1,2-trimethylhydrazine | N-methylaniline | 1,1,2,4-tetramethyl-4-phenylthiosemicarbazide. |
| 57 | ____do____ | m-Chloro-N-methylaniline | 4-(m-chlorophenyl)-1,1,2,4-tetramethylthiosemicarbazide. |
| 58 | ____do____ | p-Chloro-N-methylaniline | 4-(p-chlorophenyl)-1,1,2,4-tetramethylthiosemicarbazide. |
| 59 | ____do____ | 3,4-dichloro-N-methylaniline | 4-(3,4-dichlorophenyl)-1,1,2,4-tetramethylthiosemicarbazide. |
| 60 | ____do____ | 3,4-xylyl-N-methylaniline | 4-(3,4-xylyl)-1,1,2,4-tetramethylthiosemicarbazide. |
| 61 | ____do____ | 3,5-dichloro-N-methylaniline | 4-(3,5-dichlorophenyl)-1,1,2,4-tetramethylthiosemicarbazide. |
| 62 | ____do____ | 3-chloro-4-nitro-N-ethylaniline | 4-(3-chloro-4-nitrophenyl)-4-ethyl-1,1,2-trimethylthiosemicarbazide. |
| 63 | 1-(2-hydroxybutyl)-1,2-dimethylhydrazine | 3-bromo-4-ethoxy-N-propylaniline | 4-(3-bromo-4-ethoxyphenyl)-1-(2-hydroxybutyl)-1,2-dimethylthiosemicarbazide. |
| 64 | 1-(cyanomethyl)-1,2-dimethylhydrazine | 3-fluoro-4-nitro-N-butylaniline | 4-(3-fluoro-4-nitrophenyl)-4-butyl-1-cyanomethyl-1,2-dimethylthiosemicarbazide. |

EXAMPLE 65

4-(3,4-dichlorophenyl)-1,1,2-trimethylsemicarbazide

| | Percent by weight |
|---|---|
| 4-(3,4-dichlorophenyl)-1,1,2-trimethylsemicarbazide | 80 |
| Dioctyl sodium sulfosuccinate 85–15 reaction product with sodium benzoate | 1 |
| Ca lignin sulfonate (partially desulfonated) | 2 |
| Attapulgite clay | 17 |

The above wettable powder is prepared by blending and grinding in a micropulverizer, then reblending.

This wettable powder formation is suspended in water and applied pre-emergence, under constant agitation, to newly planted corn. Rate of application is 2 to 3 pounds of formulation in 60 gallons of water per treated acre. Application is made from nozzles centered over the corn rows, so that the spray pattern covers only approximately one-third of the entire field. Weeds such as ragweed, chickweed, lamb's-quarters, mustard, pigweed, crabgrass, and yellow foxtail emerge in the treated area but die within 10 to 14 days. No crop injury is noted.

Similar results are obtained with cotton, soybeans, and peanuts.

A related compound, 4-(3,4-dichlorophenyl)-1,1,2,-trimethyl-3-thiosemicarbazide, in a similar type of test, gives good control of crabgrass, mustard, foxtail, and volunteer alfalfa. Application rates of two pounds (active) per acre cause no visible injury to sorghum.

In like manner the compounds of Examples 6, 7, 11–4 are suitable for formulation and use as described in Example 65.

The above product is prepared and applied in the same manner and to the same plants as Example 65.

In like manner the compounds of Examples 2–5, 8–10, and 15–25 are suitable for formulation and use as described in Example 65a.

EXAMPLE 66

4-(3,4-dichlorophenyl)-1,1,2-trimethyl-3-thiosemicarbazide

| | Percent by weight |
|---|---|
| 4(3,4 - dichlorophenyl) - 1,1,2 - trimethyl - 3-thiosemicarbazide | 25 |
| Polyoxyethylated tall oil | 1 |
| Partially desulfonated Ca lignin sulfonate | 2 |
| Attapulgite clay | 72 |

The above product is prepared in the same manner as Example 65.

The above formulation is used at the rate of 4 pounds of active ingredient in 80 gallons of water per acre to provide pre-emergence weed control in sugar cane. Application is made utilizing a farm-type tractor sprayer. The weed seedlings emerge and die and the chemical has sufficient residual effect to prevent growth of a new stand of weed for several weeks. Some weeds which are controlled include yellow foxtail, crabgrass, pigweed, Portulaca, and cocklebur.

Formulations of this type are also prepared from the compounds of Examples 26–32 and 34–39 and applied for weed control.

EXAMPLE 67

*4-(p-chlorophenyl)-1,1,2-trimethylsemicarbazide*

| | Percent by weight |
|---|---|
| 4-(p-chlorophenyl)-1,1,2-trimethylsemicarbazide | 25 |
| Methyl cellulose | 3 |
| Kaolin clay | 72 |

The above composition is blended and micropulverized, then mixed in a pug mill with 16–20% water and extruded through ⅛-inch holes, cutting the extrusions to a length of about 1/16-inch. The irregular wafers produced are dried and screened to a range of 7 to 15 mesh.

By means of a farm-type fertilizer spreader, the above composition is broadcast prior to the annual growing season at the rate of 150 pounds per acre to an area around oil storage tanks where complete weed control minimizes the first hazard. Control is obtained for an extended period of such species as crabgrass, foxtail, barnyard grass, mustard, mare's-tail pigweed, black eyed Susan, nightshade, brome grass, ox-eye daisey, and wild snapdragon.

In like manner Examples 3–26 are formulated and applied for weed control in the manner described above.

EXAMPLE 68

*4-(3-chloro-4-cumenyl)1,1,2-trimethylsemicarbazide*

| | Percent by weight |
|---|---|
| 4-(3-chloro-3-cumenyl)-1,1,2-trimethylsemicarbazide | 30 |
| Sodium lignin sulfonate | 10 |
| Hydrated attapulgite clay | 2 |
| Water | 58 |

The above components are mixed together in a ball mill and ground until the particles are substantially all below 10 microns to yield an aqueous dispersion.

This formulation is extended with water and applied from a tractor-mounted sprayer to weed seedlings competing with corn which at the time of treatment is in the 4 to 5-leaf stage. Three pounds of active ingredient is applied in 50 gallons of water per acre. The spray pattern is arranged so that the foilage of the weeds is thoroughly wetted, but the crop plants are contacted to the least possible extent. Weeds controlled—without visible crop injury—include velvet leaf, pigweed, annual morning glory, crabgrass, giant foxtail, lamb's-quarters, and volunteer seedling alfalfa.

The compounds of Examples 1, 2, 4–8, 11–14 and 26 are also formulated as described above and used for weed control in a similar manner.

EXAMPLE 69

*1-ethyl-1,2,4-trimethyl-4-phenylsemicarbazide*

| | Percent by weight |
|---|---|
| 1-ethyl-1,2,4-trimethyl-4-phenylsemicarbazide | 25 |
| Mixed polyoxyethylene sorbitan monotallate and ethylene diamine dodecylbenzene sulfonate | 5 |
| Xylene | 70 |

The above emulsifiable oil is prepared by simple mixing of the mutually soluble components.

The composition is extended with an herbicidal oil or water for application to weed-infested areas. When applied from a railroad spray car to vegetation growing alongside the track at the rate of 25 pounds (active) per acre in 100 gallons of Lion Herbicidal Oil #6 excellent weed control is obtained. Control of beggar-tick, flower-of-an-hour, cocklebur, pigweed, lamb's-quarters, barnyard grass, quack grass, foxtail, and crabgrass is obtained.

The semicarbazides in Examples 47–64 are formulated in like manner and give similar weed control when applied at the same concentration of active agent.

EXAMPLE 70

*4-(3-chloro-4-methylphenyl)-1,2-dimethylsemicarbazide*

| | Percent by weight |
|---|---|
| 4-(3-chloro-4-methylphenyl) - 1,2 - dimethylsemicarbazide | 20 |
| Sodium lignin sulfonate | 10 |
| Anhydrous sodium sulfate | 10 |
| Kaolin clay | 30 |
| Mississippi sub-bentonite | 30 |

The above composition is blended and micropulverized, then moistened, granulated, dried and screened to a mesh size of 15 to 30 mesh.

This pellet composition is applied by hand at the rate of 200 pounds per acre to a weed infestation around telephone and electric power poles, bridge abutments, and sign posts. Excellent control of quack grass, ragweed, bachelor's-button, black-eyed Susan, wild carrot, cheat, crabgrass, and foxtail is obtained.

The compounds of Examples 1–26 are formulated and used for weed control as described above.

EXAMPLE 71

*Granular composition*

| | Percent by weight |
|---|---|
| 1,1,2-trimethyl-4-(3,4-xylyl)-semicarbazide | 3 |
| Attapulgite clay | 97 |

The above components are blended, micropulverized, moistened with water and moist granulated. After drying, the granules are screened to particles in the range of 15–60 mesh.

By utilization of a tractor-mounted granular spreader the above composition is broadcast at the rate of 3 pounds (active) per acre as a pre-emergence treatment for control of annual broadleaf and grass weeds in newly planted peanuts. By treating a 14-inch band over the row when the rows are 42-inches apart, it is possible to reduce the amount used to 1 pound per acre. Excellent control of crabgrass, foxtail, chickweed, pigweed, lamb's-quarters, and velvet leaf is obtained.

The compounds in Examples 1–8 and 10–27 are formulated and applied for weed control as described above.

Listed below are further examples of compounds of this invention which may be prepared and used according to the methods described herein.

Ex.
(72) 4-(3-chloro-4-methoxyphenyl)-1,2-dimethyl-1-butylsemicarbazide
(73) 4-(3-bromo-4-ethoxyphenyl)-1,2,-dimethylsemicarbazide
(74) 4-(4-chloro-3-propoxyphenyl)-1,2-dimethyl-1-isopropylsemicarbazide
(75) 4-(3-butoxy-5-fluorophenyl)-1,2-dimethyl-1-propylsemicarbazide
(76) 4-(3-bromo-4-nitrophenyl)-1-(3-methoxypropyl)-1,2-dimethylsemicarbazide
(77) 4-(3-fluoro-4-tolyl)-1-(2-bromoethyl)-1,2-dimethylsemicarbazide
(78) 4-(3-chloro-5-fluorophenyl)-1-(3-chloropropyl)-1,2-dimethylsemicarbazide
(79) 4-(3,5-diethylphenyl)-1,2-dimethyl-1-vinylsemicarbazide
(80) 4-(2,4-dipropylphenyl)-1-(2-butenyl)-1,2-dimethylsemicarbazide
(81) 4-(3,5-diisopropylphenyl)-4-butyl-1-(2-methoxyethyl)-1,2-dimethylsemicarbazide
(82) 4-(2,3,4-trichlorophenyl)-4-isopropyl-1,2-dimethyl-1-propylsemicarbazide
(83) 4-(2,4,5-trichlorophenyl)-1,2-dimethyl-1-propylthiosemicarbazide
(84) 4-(2,5-dichloro-4-cumenyl)-1,2-dimethyl-1-butylsemicarbazide

(85) 4-(3,5-dichloro-4-methyl)-4-ethyl-1,2-dimethyl-1-propionylsemicarbazide
(86) 4-(2,5-dichloro-4-methoxy)-1,2-dimethyl-1-(2-butyl)-semicarbazide
(87) 4-(3,5-diethylphenyl)-2-n-propyl-1,1-dimethyl-semicarbazide
(88) 4-(2,4-dipropylphenyl)-2-n-butyl-1,1-dimethyl-semicarbadize
(89) 4-(2,3,4-trichlorophenyl)-2-t-butyl-1,1-dimethyl-semicarbazide
(90) 4-(2,5-dichlorophenyl)-2-ethyl-1,1-dimethyl-thiosemicarbazide

EXAMPLE 91

*4-(3,4-dichlorophenyl)-1,1,2-trimethylsemicarbazide salt with trichloroacetic acid*

A mixture containing 4.36 parts by weight of 4-(3,4,-dichlorophenyl)-1,1,2-trimethylsemicarbazide, 2.72 parts by weight of trichloroacetic acid and 27 parts by volume of xylene is allowed to stand overnight at ambient temperature. The salt complex is isolated by stopping off the xylene and washing the residue with an equal amount of pentane. The product is heated in-vacuo to remove the traces of pentane, and the residual oil remaining is the desired compound.

Similarly, acid addition compounds of other 4-aryl semicarbazides herein disclosed can be produced by substituting the appropriate 4-aryl semicarbazide in like quantity or substituting another acid in like quantity such as 2,3,6-trichlorobenzoic acid, p-toluene sulfonic acid, 2,4-dichlorophenoxy acetic acid and dodecylbenzenesulfonic acid.

EXAMPLE 92

*4-(3,4-dichlorophenyl)-1,1,2-trimethylcarbazide; 1-1 addition compound with trichloroacetic acid*

Percent by weight
4 - (3,4 - dichlorophenyl) - 1,1,2 - trimethylcarbazide;
1-1 addition compound with trichloroacetic acid___ 25
A blend of polyalcohol carboxylic esters and oil soluble petroleum sulfonates _____ 2
Attapulgite clay _____ 73

The above oil dispersible powder is prepared by blending the components and micropulverizing until substantially all particles are below 50 microns. Upon addition to an herbicidal oil, the product first disperses, then the active compound dissolves in the oil.

The above formulation is mixed with 60 gallons of herbicidal oil and is applied at the rate of 25 pounds active compounds per acre for the control of annual and perennial broadleaf and grass weeds growing along railroad rights of way. Excellent control of crabgrass, barnyard grass, quack grass, lamb's-quarters, pigweed, goldenrod and asters is obtained. Weed control is maintained for extended periods of time.

Also, rates of 4 pounds active compound per acre in 15 gallons diesel oil applied as a directed post-emergence treatment gives excellent control of annual grasses such as crabgrass, barnyard grass and goose grass in established sugar cane.

In a similar manner the other acid addition compounds of Example 91 can be formulated and applied to give the same results.

The invention claimed is:
1. Method for the control of weeds comprising applying to a locus to be protected, in amount sufficient to exert herbicidal action, a compound of the formula:

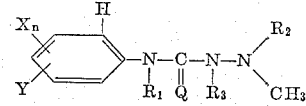

wherein
$R_1$ is selected from the group consisting of hydrogen and alkyl of 1 through 4 carbon atoms;
$R_2$ is selected from the group consisting of hydrogen, unsubstituted alkyl of 1 through 4 carbon atoms, alkyl of 1 through 4 carbon atoms substituted with at least one substituent selected from the group consisting of hydroxyl, cyano, chlorine, bromine and methoxy, alkenyl of 2 through 4 carbon atoms and acyl of 1 through 4 carbon atoms;
$R_3$ is alkyl of 1 through 4 carbon atoms;
Q is selected from the group consisting of oxygen and sulfur;
X is selected from the group consisting of hydrogen, halogen and alkyl of 1 through 4 carbon atoms;
Y is selected from the group consisting of hydrogen, halogen, nitro and alkoxy of 1 through 4 carbon atoms;
$n$ is a positive whole integer less than 3; with the limitation that when Y is selected from the group consisting of alkoxy and nitro, X is halogen.

2. Method of claim 1 wherein the compound applied is 4-(3,4-dichlorophenyl)-1,1,2-trimethylsemicarbazide.
3. Method of claim 1 wherein the compound applied is 4-(3-chloro-4-cumenyl)-1,1,2-trimethylsemicarbazide.
4. Method of claim 1 wherein the compound applied is 4-(phenyl)-1,1,2-trimethylsemicarbazide.
5. Method of claim 1 wherein the compound applied is 4-(p-bromophenyl)-1,1,2-trimethylsemicarbazide.
6. Method of claim 1 wherein the compound applied is 4-(p-chlorophenyl)-1,1,2-trimethylsemicarbazide.

References Cited by the Examiner
UNITED STATES PATENTS

| | | | |
|---|---|---|---|
| 2,580,653 | 1/1952 | Bridgeman | 71—2.6 |
| 2,655,447 | 10/1953 | Todd | 71—2.6 |
| 2,658,062 | 11/1953 | Jones | 260—554 X |
| 2,678,878 | 5/1954 | Stewart | 71—2.6 |
| 2,782,112 | 2/1957 | Gilbert et al. | 71—2.6 |

OTHER REFERENCES

Chemical Abstracts, vol. 41, col. 3911(i), 1947.
Chemical Abstracts, vol. 61, col. 9988(a), 1964.
Kloges et al., Justus Liebig's, Annalen der Chemie, vol. 547 (1941), pp. 28–29.
Thompson et al., Botanical Gazette, 107, 475–507 (pp. 500 and 505 relied upon).

LEWIS GOTTS, *Primary Examiner.*
JAMES O. THOMAS, Jr., *Examiner.*